United States Patent
Sasaki (10) Patent No.: US 7,911,514 B2
(45) Date of Patent: Mar. 22, 2011

(54) DEFECTIVE PIXEL CORRECTION DEVICE

(75) Inventor: Gen Sasaki, Osaka (JP)

(73) Assignee: Mega Chips Corporation, Osaka-shi (JP)

( * ) Notice: Subject to any disclaimer, the term of this patent is extended or adjusted under 35 U.S.C. 154(b) by 529 days.

(21) Appl. No.: 11/765,896

(22) Filed: Jun. 20, 2007

(65) Prior Publication Data

US 2008/0030600 A1  Feb. 7, 2008

Related U.S. Application Data

(62) Division of application No. 10/814,256, filed on Apr. 1, 2004, now Pat. No. 7,812,866.

(30) Foreign Application Priority Data

Apr. 11, 2003  (JP) ................................. 2003-107851

(51) Int. Cl.
*H04N 9/64* (2006.01)
(52) U.S. Cl. ......... 348/246; 348/241; 348/243; 348/247
(58) Field of Classification Search .................. 348/241, 348/243, 246, 247; 382/266, 268, 269, 275
See application file for complete search history.

(56) References Cited

U.S. PATENT DOCUMENTS

| | | | | |
|---|---|---|---|---|
| 7,034,872 B1 * | 4/2006 | Yamamoto | ..................... | 348/246 |
| 2002/0005904 A1 * | 1/2002 | Mendis | ......................... | 348/246 |
| 2003/0001078 A1 * | 1/2003 | Baharav et al. | ............ | 250/208.1 |
| 2004/0032516 A1 * | 2/2004 | Kakarala | ...................... | 348/246 |

FOREIGN PATENT DOCUMENTS

| | | |
|---|---|---|
| JP | 4-345383 | 12/1992 |
| JP | 5-268527 | 10/1993 |
| JP | 6-284346 | 10/1994 |
| JP | 7-7675 | 1/1995 |
| JP | 7-143403 | 6/1995 |
| JP | 7-162762 | 6/1995 |
| JP | 2000-92397 | 3/2000 |
| JP | 2000-287135 | 10/2000 |
| JP | 2001-251636 | 9/2001 |
| JP | 2002-27325 | 1/2002 |
| JP | 2002-84464 | 3/2002 |
| JP | 2002-142157 | 5/2002 |
| JP | 2002-218485 | 8/2002 |

(Continued)

OTHER PUBLICATIONS

U.S. Appl. No. 11/765,916, filed Jun. 20, 2007, Sasaki.

(Continued)

*Primary Examiner* — Yogesh K Aggarwal
(74) *Attorney, Agent, or Firm* — Oblon, Spivak, McClelland, Maier & Neustadt, L.L.P.

(57) ABSTRACT

First pixel data of a pixel of interest is output from a first shift register, while second and third pixel data of neighboring pixels indicative of the same color are output from second and third shift registers, respectively. Differential data between estimated pixel data calculated from the second and third pixel data and the first pixel data is input to a comparator. A threshold value stored in a register is modulated by the estimated pixel data, and is input to the comparator as modulated threshold data. When the comparator judges that the differential data is greater than the modulated threshold data, a selector outputs the estimated pixel data as corrected pixel data.

13 Claims, 6 Drawing Sheets

FOREIGN PATENT DOCUMENTS

| | | |
|---|---|---|
| JP | 2002-223391 | 8/2002 |
| JP | 2002-247445 | 8/2002 |
| JP | 2002-330354 | 11/2002 |
| JP | 2003-9167 | 1/2003 |
| JP | 2003-101887 | 4/2003 |
| JP | 2003-259220 | 9/2003 |
| JP | 2003-259221 | 9/2003 |
| JP | 2004-297267 | 10/2004 |

OTHER PUBLICATIONS

U.S. Appl. No. 12/481,062, filed Jun. 9, 2009, Sasaki.

* cited by examiner

DEFECTIVE PIXEL CORRECTION DEVICE

CROSS REFERENCE TO RELATED APPLICATIONS

This application is a Divisional of and claims the benefit of priority under 35 U.S.C. §120 from U.S. Ser. No. 10/814,256, filed Apr. 1, 2004, and claims the benefit of priority under 35 U.S.C. §119 from Japanese Patent Application priority document 2003-107851 filed in Japan on Apr. 11, 2003.

BACKGROUND OF THE INVENTION

1. Field of the Invention

The present invention relates to a technique of correcting defective pixels present in a sensor.

2. Description of the Background Art

Sensors such as CCDs (Charge Coupled Devices) may contain defective pixels containing white spot defects, black spot defects or the like. Such defective pixels affect image quality, and thus require correction. For instance, CCD manufacturing plants employ a method of identifying addresses of such defective pixels and storing information on the addresses in a nonvolatile memory, so that CCDs are shipped with such information. Accordingly, when capturing images, digital cameras and the like use a method of identifying the position of a defective pixel based on such address information to correct the defective pixel by its neighboring pixels. This method requires a memory for storing the address information, which interferes with size reduction in circuit scale.

In this respect, Japanese Patent Application Laid-Open No. 2002-223391 discloses a technique of eliminating the need to provide a memory for storing address information.

On the other hand, Japanese Patent Application Laid-Open No. 2002-142157 discloses a technique of correcting defective pixels in accordance with the brightness level of images.

However, the conventional technique of eliminating the need to provide a memory for storing address information is disadvantageous in accuracy of correction, while the conventional technique of correcting defective pixels in accordance with the brightness level of images causes increase in circuit scale.

SUMMARY OF THE INVENTION

The present invention is directed to a defective pixel correction device.

According to an aspect of the present invention, the defective pixel correction device comprises: a circuit for receiving image data from a sensor; a circuit for obtaining an estimated pixel value of a pixel of interest from pixel data of neighboring pixels of the pixel of interest; a circuit for obtaining a differential value between a sensor-input pixel value of the pixel of interest and the estimated pixel value; a modulation circuit for modulating a predetermined threshold value by the estimated pixel value, thereby obtaining a modulated threshold value; and a circuit for comparing the differential value and the modulated threshold value, and when the differential value is greater than the modulated threshold value, outputting the estimated pixel value as a pixel value of the pixel of interest instead of the sensor-input pixel value.

According to the present invention, defective pixel correction appropriate to brightness can be performed. Further, there is no need to provide a memory for storing address information on a defective pixel, enabling reduction in circuit scale.

According to another aspect of the present invention, the defective pixel correction device comprises: a circuit for receiving pixel data from a color sensor; a circuit for obtaining an estimated pixel value of a pixel of interest from pixel data of neighboring pixels of the pixel of interest indicative of the same color as the pixel of interest; a circuit for obtaining a differential value between a sensor-input pixel value of the pixel of interest and the estimated pixel value; a circuit for storing a threshold value corresponding to each color of the color sensor; and a comparing and selecting circuit for comparing the differential value and the threshold value corresponding to the color of the pixel of interest, and when the differential value is greater than the threshold value, outputting the estimated pixel value as a pixel value of the pixel of interest instead of the sensor-input pixel value.

According to the present invention, a threshold value is prepared for each color, enabling defective pixel detection with higher accuracy.

It is therefore an object of the present invention to provide a defective pixel correction technique capable of performing appropriate correction with high accuracy while achieving reduction in circuit scale.

These and other objects, features, aspects and advantages of the present invention will become more apparent from the following detailed description of the present invention when taken in conjunction with the accompanying drawings.

DESCRIPTION OF THE PREFERRED EMBODIMENTS

Preferred embodiments of the present invention will be described in reference to the accompanying drawings.

First Preferred Embodiment

Figure 1:
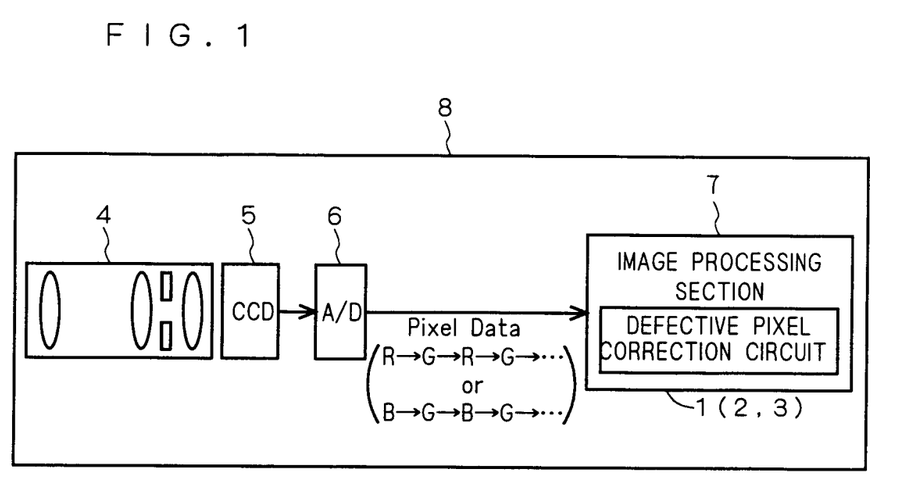
FIG. 1 is a schematic block diagram of a digital camera.

FIG. 1 is a schematic block diagram of a digital camera 8 including a defective pixel correction circuit 1 according to a first preferred embodiment of the present invention. In the digital camera 8, reflected light from a subject is received by a CCD imager 5 through an optical system 4. The CCD imager 5 according to the present embodiment is a color sensor equipped with Bayer pattern three color filters of R (red), G (green) and B (blue). Analog signals indicative of respective RGB colors output from the CCD imager 5 undergo various kinds of analog processing, and are thereafter converted into digital form in an A/D converter 6, to be input to an image processing section 7 as digital image data. In the present embodiment, as shown in the diagram, pixel data is output in pixel lines in the order of RGRG and GBGB alternately and repetitively. This is merely an example, and the order of colors being output is different depending on the color filter pattern of the CCD imager 5.

The image processing section 7 is a functional section for executing various kinds of digital processing on input pixel data. The defective pixel correction circuit 1 corrects pixel data derived from a defective pixel present in the CCD imager 5.

Figure 2:
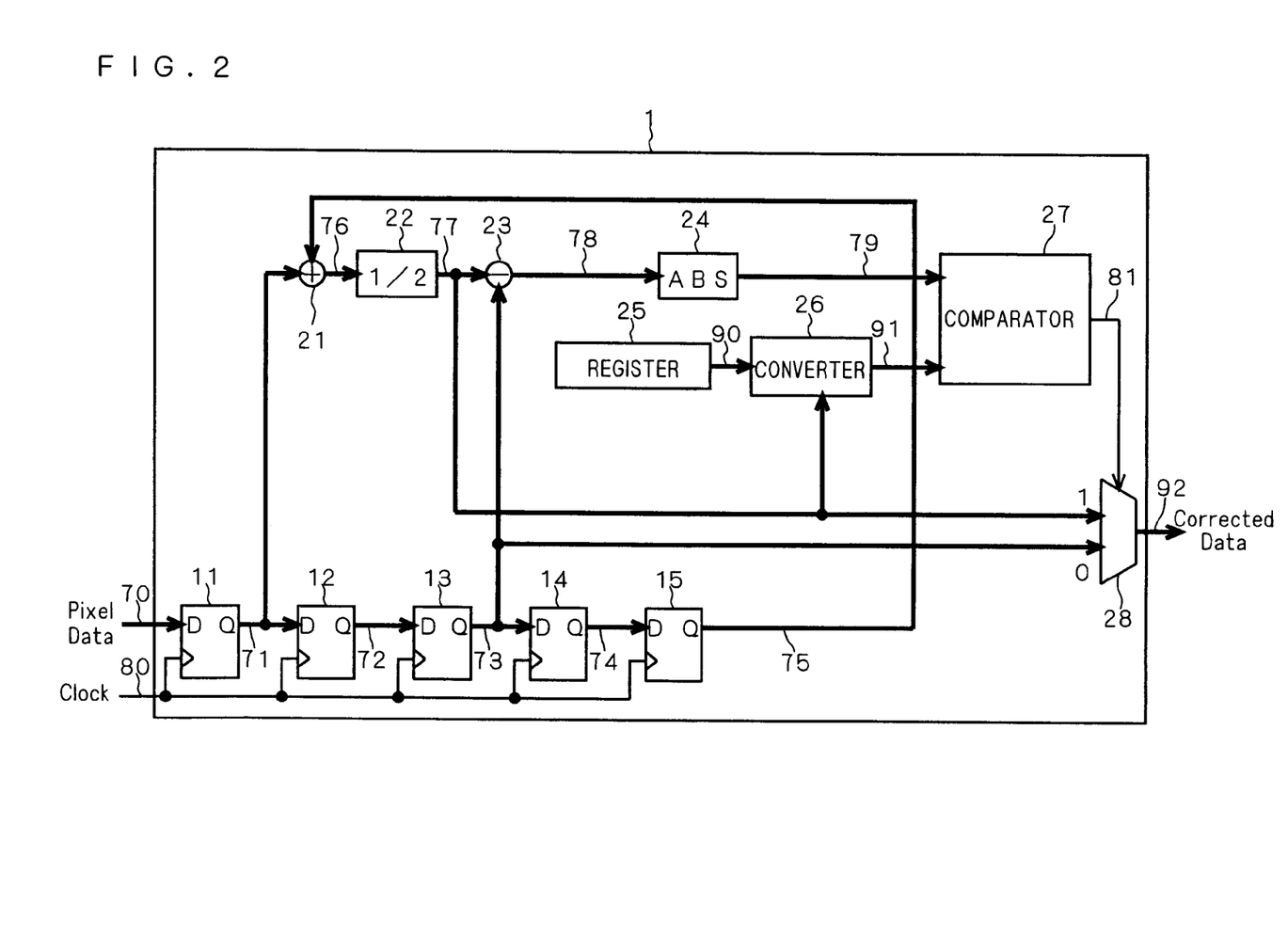
FIG. 2 is a functional block diagram of a defective pixel correction circuit according to a first preferred embodiment of the present invention.

FIG. 2 is a functional block diagram of the defective pixel correction circuit 1. Pixel data 70 output from the CCD imager 5 is input to the defective pixel correction circuit 1, and specifically, to a shift register including registers 11 to 15.

The registers 11 to 15 are each capable of holding bit data corresponding to one pixel, and each transfer pixel data corresponding to one pixel which they are holding to a subsequent register in synchronization with a clock signal 80. Therefore, the registers 11 to 15 can hold pixel data corresponding to five pixels. As shown in the diagram, respective pieces of pixel data output from the registers 11 to 15 are indicated by 71 to 75.

Since the pixel data 70 input to the defective pixel correction circuit 1 represents a line of pixels in the order of RGRG or BGBG as described above, pixel data indicative of one of RGB is stored in alternate ones among the registers 11 to 15. Therefore, the registers 11, 13 and 15 each hold pixel data indicative of the same color, and the respective pieces of pixel data 71, 73 and 75 output in synchronization with the clock signal 80 are indicative of the same color.

The pieces of pixel data 71 and 75 output at a certain clock cycle are added in an adder 21. Output data 76 from the adder 21 is divided by two in an average calculating circuit 22. Estimated pixel data 77 is thereby output.

Here, the respective pieces of pixel data 71 and 75 are indicative of the same color, and are located ahead and behind the pixel data 73, respectively. Assuming that the pixel data 73 is derived from a pixel of interest, the estimated pixel data 77 indicates the average of pixel values of two pixels of the same color located ahead and behind the pixel of interest. In the case where the pixel of interest is a defective pixel, the pixel data 77 is used for estimating the pixel value of the pixel of interest instead of the pixel data 73. That is, the pixel data 77 is data obtained from neighboring pixels of the pixel of interest for estimating the pixel value of the pixel of interest.

Next, differential data 78 indicative of the difference between the estimated pixel data 77 and pixel data 73 is calculated in a subtracter 23. The pixel data 73 indicates the pixel value of the pixel of interest input from the CCD imager 5. In other words, the pixel data 73 indicates a sensor-input pixel value while the estimated pixel data 77 indicates an estimated pixel value of the pixel of interest.

Further, an absolute value arithmetic circuit 24 obtains the absolute value of the differential data 78, so that differential data 79 is output. The differential data 79 is input to a comparator 27.

On the other hand, the estimated pixel data 77 output from the average calculating circuit 22 is also input to a converter 26.

Figure 3:
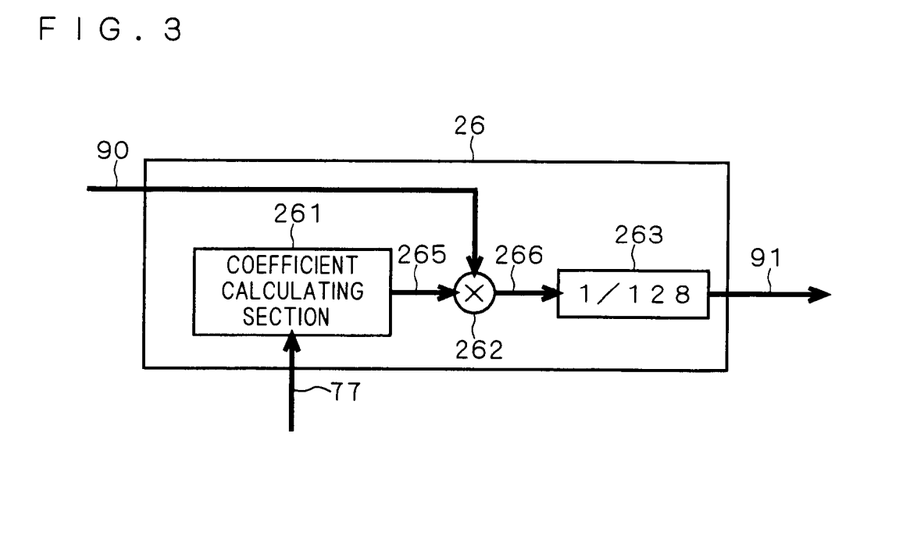
FIG. 3 is a functional block diagram of a converter for modulating threshold values according to the first preferred embodiment.

FIG. 3 is a functional block diagram of the converter 26. The estimated pixel data 77 input to the converter 26 is then input to a coefficient calculating section 261, so that a coefficient for threshold modulation is calculated. The process of calculating the coefficient from the estimated pixel data 77 is executed using the function shown in the graph of FIG. 4. In the graph, the horizontal axis indicates the value of the estimated pixel data 77 (i.e., pixel value), and the vertical axis indicates the coefficient. Here, the estimated pixel data 77 is 10-bit data and is converted to a 10-bit coefficient using the function, by way of example.

Figure 4:
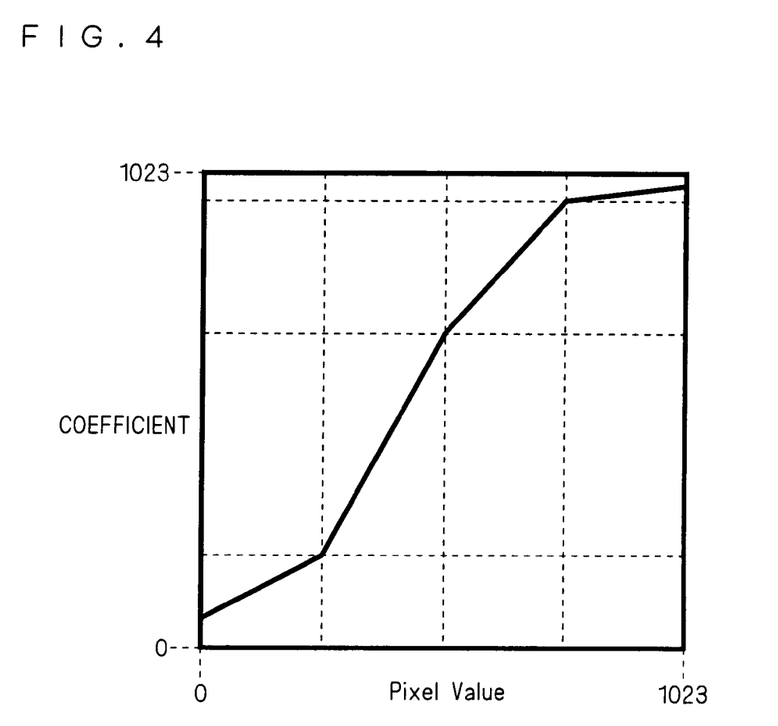
FIG. 4 shows the relationship between brightness and modulation coefficient.

As shown in the graph, the function for obtaining the coefficient is not a simple linear function, but is set to have a different inclination in each range of pixel values of the estimated pixel data 77. That is, a different function is applied to each brightness level. The inclinations of the function as shown in the graph are just an example, and any function can be set in each range.

However, as shown in FIG. 4, it is preferable to set the function such that the coefficient increases as the pixel value of the estimated pixel data 77 increases, that is, as brightness increases. This can suppress over-correction in a high-brightness area, and can also prevent failure in correction in a middle-brightness area and a dark area.

Coefficient data 265 output from the coefficient calculating section 261 is multiplied by threshold data 90 output from a register 25 (shown in FIG. 2) in a multiplier 262, so that modulated threshold data 266 is obtained. The threshold data 90 is data indicative of a threshold value for determining a defective pixel. Modulating the threshold data 90 by the coefficient data 265 causes the threshold value to be modulated in accordance with the brightness of the estimated pixel data 77. The modulated threshold data 266 thereby obtained is divided by 128 in a divider 263.

In the present example, the threshold data 90 is multiplied by the coefficient data 265 indicative of 0 to 1023 (in 10 bits) in the multiplier 262 for modulation, and is divided by 128 (7-bit shift operation), which means the threshold value is modulated in eight ways of 0 to 7 times. The converter 26 thereby outputs modulated threshold data 91. Adjusting a divisor used in the divider 263 allows the level of threshold modulation to be arbitrarily changed.

Referring back to FIG. 2, the modulated threshold data 91 output from the converter 26 is input to the comparator 27. The comparator 27 compares the differential data 79 and modulated threshold data 91 in terms of size, and outputs a selection signal 81 according to the relationship in terms of size. Specifically, when the differential data 79 is smaller than the modulated threshold data 91, "0" is output as the selection signal 81. When the differential data 79 is greater than the modulated threshold data 91, "1" is output as the selection signal 81.

The selection signal 81 is input to a selector 28 as well as the pixel data 73 and estimated pixel data 77. When the selection signal 81 indicates "0", the selector 28 outputs the pixel data 73 as corrected pixel data 92, that is, employs a sensor-input pixel value as the pixel data of the pixel of interest. When the selection signal 81 indicates "1", the selector 28 outputs the estimated pixel data 77 as the corrected pixel data 92, that is, employs an estimated pixel value as the pixel data of the pixel of interest in place of a sensor-input pixel value. In this way, the selector 28 outputs the corrected pixel data 92 in response to respective pieces of pixel data 70 output from the CCD imager 5.

The defective pixel correction circuit 1 according to the present embodiment outputs image data captured by the digital camera 8 after performing real-time processing and defective pixel correction, which therefore eliminates the need to provide a memory for storing addresses of defective pixels. Further, it is unnecessary to capture reference levels such as black level and white level at start up of equipment, allowing starting-time to be shortened.

Furthermore, the threshold value for determining a defective pixel is modulated in accordance with the value of the estimated pixel data 77 (i.e., pixel value), which achieves improved accuracy in determining defective pixels. Specifically, it is possible to prevent over-correction occurring in the case where a defective pixel is determined on the basis of comparison with a fixed threshold value as well as to correct a defective pixel in a middle-brightness area or dark area which will not be determined as a defective pixel using a fixed threshold value.

In the present embodiment, estimated pixel data is generated using two pixels ahead and behind a pixel of interest, however, neighboring pixels to be chosen are not limited thereto. For instance, the estimated pixel data may be generated using four neighboring pixels on top, bottom, right and left of a pixel of interest on a two-dimensional image.

Alternatively, where the primary object lies in reducing circuit scale, one pixel may be chosen as a neighboring pixel, and the pixel value of that pixel may be employed as the estimated pixel value of a pixel of interest. In this case, referring to FIG. 2, the registers 11 and 12 are removed, so that the registers 13, 14 and 15 constitutes a shift register. Then, the pixel data input to the register 15 is employed as the estimated pixel data while the pixel data input to the register 13 is derived from the pixel of interest. The pixel data stored in the register 15 is already subjected to defective pixel correction, and is thus suitable for use as the estimated pixel data. Therefore, it is not necessary to provide the adder 21 or average calculating circuit 22. The subtracter 23 calculates the difference between the pieces of pixel data 73 and 75, to obtain the differential data 78.

Second Preferred Embodiment

A defective pixel correction circuit 2 according to a second preferred embodiment will be described now. The defective pixel correction circuit 2 is also incorporated into an image pickup device or the like to perform correction of defective pixels. In the present embodiment, as shown in FIG. 1, the defective pixel correction circuit 2 is incorporated into the digital camera 8 for correcting pixel data output from the CCD imager 5.

Figure 5:
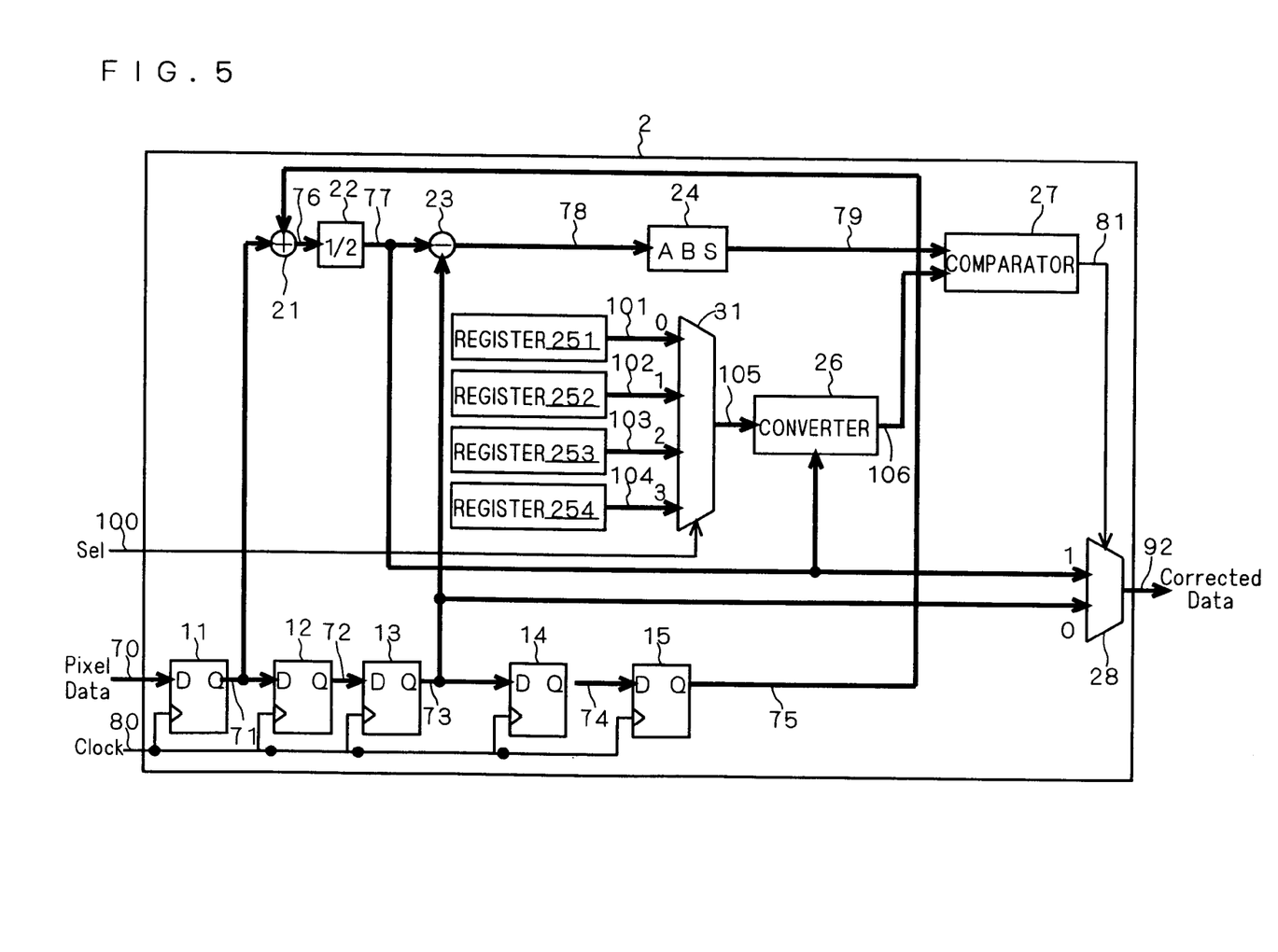
FIG. 5 is a functional block diagram of a defective pixel correction circuit according to a second preferred embodiment of the invention.

FIG. 5 is a block diagram of the defective pixel correction circuit 2 of the present embodiment. In the diagram, similar functional sections as those described in the first preferred embodiment are indicated by the same reference numerals. The following description will be focused on functional sections different from those of the first preferred embodiment.

The respective pieces of pixel data 71 and 75 output from the registers 11 and 15 are processed in the adder 21 and average calculating circuit 22, so that the estimated pixel data 77 is obtained. The differential data 79 obtained through the subtracter 23 and absolute value arithmetic circuit 24 is input to the comparator 27. The estimated pixel data 77 is also input to the converter 26.

Different from the first preferred embodiment, the defective pixel correction circuit 2 includes a plurality of registers 251 to 254 for storing threshold values corresponding to the respective colors of pixel data output from the CCD imager 5. The registers 251 and 252 store R threshold data 101 and G threshold data 102, respectively, in correspondence with the pixel line in the order of RGRG. The registers 253 and 254 store B threshold data 103 and G threshold data 104, respectively, in correspondence with the pixel line in the order of BGBG. The two pieces of G threshold data 102 and 104 may be stored in a common register.

A selection signal 100 is input to a selector 31 as well as the threshold data 101 to 104 for the respective colors. The selection signal 100 is supplied from a timing generator not shown, for identifying the color of the pixel data 71, 73 and 75 (all indicative of the same color) currently being output from the registers 11, 13 and 15, respectively. In the pixel line in the order of RGRG, the selection signal 100 indicates "0" when R is output, and "1" when G is output. In the pixel line in the order of BGBG, the selection signal 100 indicates "2" when B is output, and "3" when G is output.

In response to the selection signal 100, the selector 31 outputs threshold data 105 for the corresponding color. The threshold data 105 is input to the converter 26, where the same processing is conducted as in the first preferred embodiment, and modulated threshold data 106 is output.

The comparator 27 compares the differential data 79 and modulated threshold data 106 to output "0" as the selection signal 81 when the differential data 79 is smaller than the modulated threshold data 106 and output "1" as the selection signal 81 when the differential data 79 is greater than the modulated threshold data 106. Then, the selector 28 outputs the pixel data 73 as corrected pixel data 92 when the selection signal 81 indicates "0", and outputs the estimated pixel data 77 as the corrected pixel data 92 when the selection signal 81 indicates "1". The corrected pixel data 92 is thereby output in response to each piece of pixel data 70 output from the CCD imager 5.

As described, according to the second preferred embodiment, the most suitable modulated threshold value can be set for each color, enabling detection of defective pixels with higher accuracy.

In the present embodiment, estimated pixel data is generated using two pixels ahead and behind a pixel of interest, however, neighboring pixels to be chosen are not limited thereto. For instance, the estimated pixel data may be generated using four neighboring pixels on top, bottom, right and left of a pixel of interest on a two-dimensional image. Alternatively, where the primary object lies in reducing circuit scale, one pixel may be chosen as a neighboring pixel, and the pixel value of that pixel may be employed as the estimated pixel value of a pixel of interest.

Third Preferred Embodiment

A defective pixel correction circuit 3 according to a third preferred embodiment will be described now. The defective pixel correction circuit 3 is also incorporated into an image pickup device or the like to perform correction of defective pixels. In the present embodiment, as shown in FIG. 1, the defective pixel correction circuit 3 is incorporated into the digital camera 8 for correcting pixel data output from the CCD imager 5.

Figure 6:
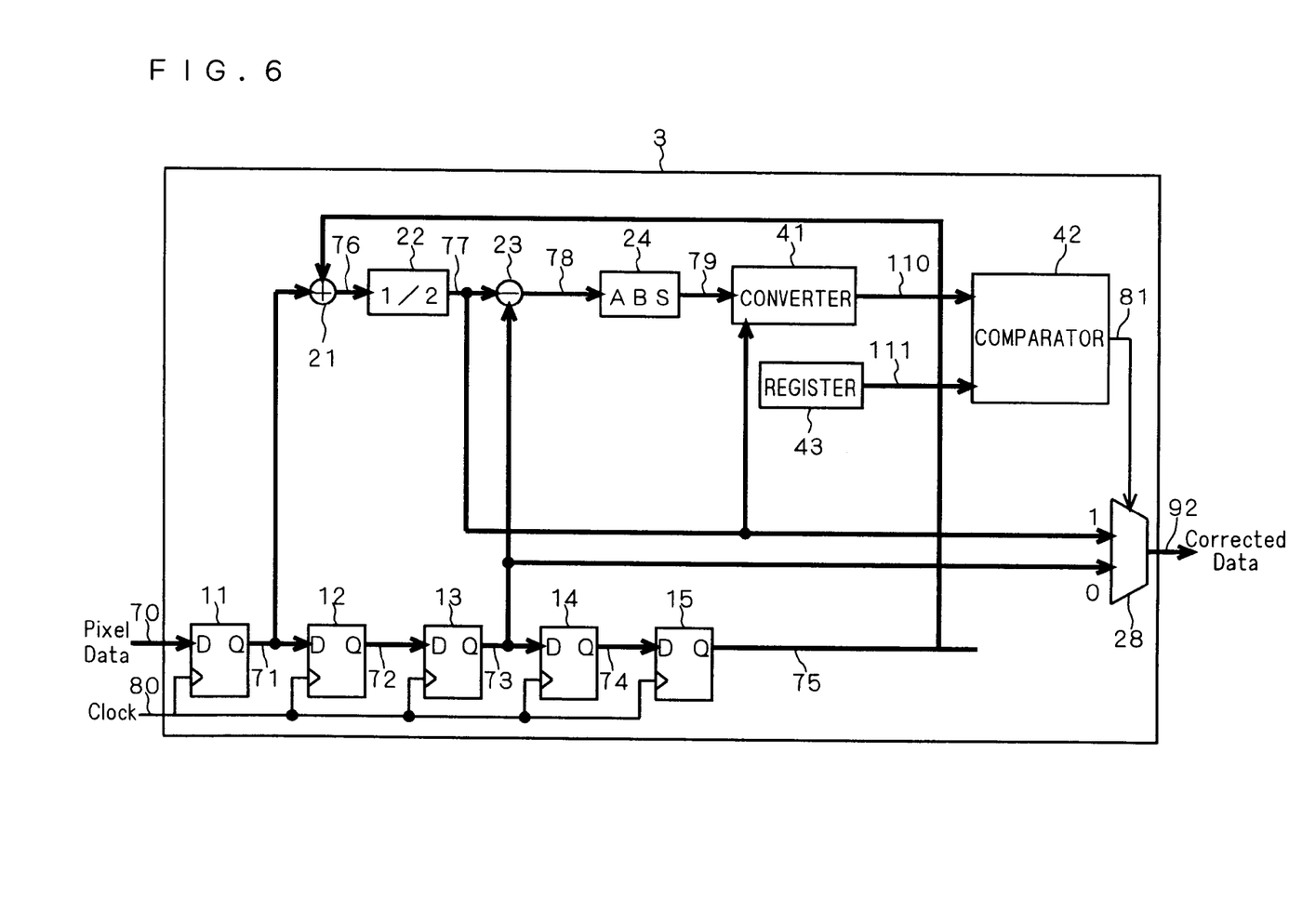
FIG. 6 is a functional block diagram of a defective pixel correction circuit according to a third preferred embodiment of the invention.

FIG. 6 is a block diagram of the defective pixel correction circuit 3 of the present embodiment. In the diagram, similar functional sections as those described in the first preferred embodiment are indicated by the same reference numerals. The following description will be focused on functional sections different from those of the first preferred embodiment.

The respective pieces of pixel data 71 and 75 output from the registers 11 and 15 are processed in the adder 21 and average calculating circuit 22, so that the estimated pixel data 77 is obtained. Further, the differential data 79 obtained through the subtracter 23 and absolute value arithmetic circuit 24 is output. Different from the first preferred embodiment, the differential data 79 is input to a converter 41. The estimated pixel data 77 is also input to the converter 41.

Figure 7:
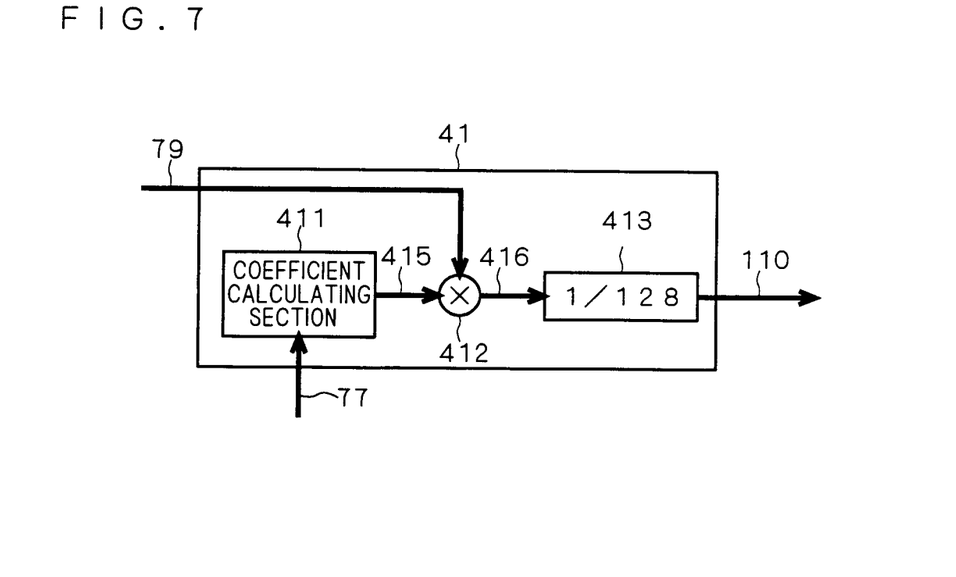
FIG. 7 is a functional block diagram of a converter for modulating threshold values according to the third preferred embodiment.

FIG. 7 is a functional block diagram of the converter 41. The estimated pixel data 77 input to the converter 41 is then input to a coefficient calculating section 411, so that a coefficient for threshold value modulation is calculated. The process of calculating the coefficient from the estimated pixel data 77 is executed using the function shown in the graph of FIG. 8. In the graph, the horizontal axis indicates the value of the estimated pixel data 77 (i.e., pixel value), and the vertical axis indicates the coefficient. Here, the estimated pixel data 77 is 10-bit data and is converted to a 10-bit coefficient using the function, by way of example.

Figure 8:
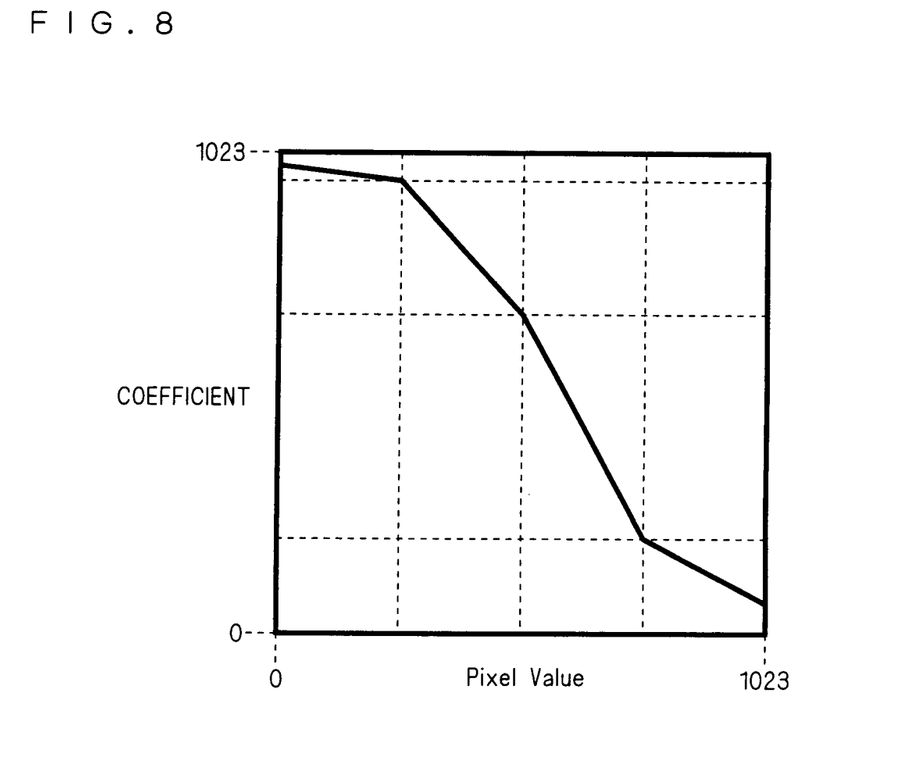
FIG. 8 shows the relationship between brightness and modulation coefficient.

As shown in the graph, the function for obtaining the coefficient is not a simple linear function, but is set to have a different inclination in each range of pixel value of the estimated pixel data 77. That is, a different function is applied to each brightness level. The inclinations of the function as shown in the graph are just an example, and any function can be determined in each range.

However, as shown in FIG. 8, it is preferable to set the function such that the coefficient increases as the pixel value of the estimated pixel data 77 decreases, that is, as brightness decreases. This can suppress over-correction in a high-brightness area, and can also prevent failure in correction in a middle-brightness area and a dark area.

Coefficient data 415 output from the coefficient calculating section 411 is multiplied by differential data 79 in a multiplier 412, so that modulated differential data 416 is obtained. The modulated differential data 416 thereby obtained is divided by 128 in a divider 413. In the present example, the differential data 79 is multiplied by the coefficient data 415 indicative of 0 to 1023 (in 10 bits) for modulation, and is divided by 128 (7-bit shift operation), which means the modulated differential value is modulated in eight ways of 0 to 7 times. The converter 41 thereby outputs modulated differential data 110.

Referring back to FIG. 6, threshold data 111 output from a register 43 and modulated differential data 110 output from the converter 41 are input to a comparator 42. Here, the threshold data 111 is indicative of a threshold value for determining a defective pixel, and is compared in terms of size with the modulated differential data 110 modulated by the coefficient data 415.

According to the relationship in terms of size, the comparator 42 outputs the selection signal 81. Specifically, when the modulated differential data 110 is smaller than the threshold data 111, "0" is output as the selection signal 81. When the modulated differential data 110 is greater than the threshold data 111, "1" is output as the selection signal 81.

When the selection signal 81 indicates "0", the selector 28 outputs the pixel data 73 as the corrected pixel data 92, that is, employs a sensor-input pixel value as the pixel data of a pixel of interest. When the selection signal 81 indicates "1", the selector 28 outputs the estimated pixel data 77 as the corrected pixel data 92, that is, employs an estimated pixel value as the pixel data of the pixel of interest. In this way, the selector 28 outputs the corrected pixel data 92 in response to respective pixel data 70 output from the CCD imager 5.

As described, image data captured by the digital camera 8 is output after undergoing real-time processing and defective pixel correction, which therefore eliminates the need to provide a memory for storing addresses of defective pixels. Further, the differential value for determining a defective pixel is modulated in accordance with the value of the estimated pixel data 77 (i.e., pixel value), which achieves improved accuracy in determining defective pixels.

In the present embodiment, estimated pixel data is generated using two pixels ahead and behind a pixel of interest, however, neighboring pixels to be chosen are not limited thereto. For instance, the estimated pixel data may be generated using four neighboring pixels on top, bottom, right and left of a pixel of interest on a two-dimensional image.

Alternatively, where the primary object lies in reducing circuit scale, one pixel may be chosen as a neighboring pixel, and the pixel value of that pixel may be employed as the estimated pixel value of a pixel of interest. In this case, referring to FIG. 6, the registers 11 and 12 are removed, so that the registers 13, 14 and 15 constitutes a shift register. Then, the pixel data input to the register 15 is employed as the estimated pixel data while the pixel data input to the register 13 is derived from the pixel of interest. The pixel data stored in the register 15 is already subjected to defective pixel correction, and is thus suitable for use as the estimated pixel data. Therefore, it is not necessary to provide the adder 21 or average calculating circuit 22. The subtracter 23 calculates the difference between the respective pieces of pixel data 73 and 75, to obtain the differential data 78.

The construction according to the present embodiment may be combined with that of the second preferred embodiment. Specifically, the register 43 for storing the threshold data 111 shown in FIG. 6 may be substituted by the circuit including the four registers 251 to 254 and selector 31. This allows the most suitable modulated threshold value to be set for each color, enabling detection of defective pixels with higher accuracy.

The above three preferred embodiments have described by way of example that the defective pixel correction circuits are each incorporated into the digital camera, however, the defective pixel correction circuits of the respective preferred embodiments may be incorporated into various types of image pickup devices and image readers such as digital movies and image scanners.

Further, the above preferred embodiments have described by way of example that defective pixel correction is performed on pixel data indicative of RGB, however, the present invention is also applicable to various image pickup devices in which pixel data indicative of Y (yellow), C (cyan) and M (magenta) is input from a CCD imager equipped with CMY filters, and defective pixel correction is performed using pixel data of these complementary colors.

Furthermore, pixel data to be processed is not limited to that output from a CCD imager, but pixel data output from various types of sensors such as CMOS sensors may be adopted.

While the invention has been shown and described in detail, the foregoing description is in all aspects illustrative and not restrictive. It is therefore understood that numerous modifications and variations can be devised without departing from the scope of the invention.

What is claimed is:

1. A defective pixel correction device comprising:

a circuit for receiving pixel data from a sensor;

a circuit for obtaining an estimated pixel value of a pixel of interest from pixel data of neighboring pixels of said pixel of interest;

a circuit for obtaining a differential value between a sensor-input pixel value of said pixel of interest and said estimated pixel value;

a modulation circuit for modulating said differential value by said estimated pixel value, thereby obtaining a modulated differential value; and a circuit for comparing said modulated differential value and a predetermined threshold value, and when said modulated differential value is greater than said threshold value, outputting said estimated pixel value as a pixel value of said pixel of interest instead of said sensor-input pixel value, wherein said modulation circuit contains a circuit for calculating a coefficient using said estimated pixel and a predetermined function of brightness versus pixel value, and said modulation circuit modulating said differential value by said coefficient.

2. The defective pixel correction device according to claim 1, wherein said sensor is a color sensor, and said neighboring pixels are indicative of the same color as said pixel of interest.

3. The defective pixel correction device according to claim 1, wherein said modulation circuit includes a circuit for modulating said differential value so that said modulated differential value decreases as said estimated pixel value varies with increasing brightness.

4. The defective pixel correction device according to claim 1, wherein said modulation circuit includes a circuit for modulating said differential value applying an individual function to each range of said estimated pixel value.

5. The defective pixel correction device according to claim 1, wherein said modulation circuit comprises a multiplier for multiplying said differential value by said coefficient to obtain a multiplied value.

6. The defective pixel correction device according to claim 5, wherein said modulation circuit divides said multiplied value by 128.

7. The defective pixel correction device according to claim 1, wherein said predetermined function has different functions of brightness versus pixel value for different brightness ranges.

8. The defective pixel correction device according to claim 1, wherein said coefficient increases as said pixel value decreases.

9. A defective pixel correction device comprising:
a circuit for receiving pixel data from a sensor;
a circuit for setting an estimated pixel value of a pixel of interest at a pixel value of a pixel indicative of the same color as said pixel of interest, located directly adjacent to said pixel of interest, already undergone defect correction;
a circuit for obtaining a differential value between a sensor-input pixel value of said pixel of interest and said estimated pixel value;
a circuit for modulating a differential value by said estimated pixel value, thereby obtaining a modulated differential value; and
a circuit for comparing said modulated differential value and a predetermined threshold value, and when said modulated differential value is greater than said threshold value, outputting said estimated pixel value as a pixel value of said pixel of interest instead of said sensor-input pixel value,
wherein said circuit for modulating contains a circuit for calculating a coefficient using said estimated pixel and a predetermined function of brightness versus pixel value, and said circuit for modulating said differential value by said coefficient.

10. The defective pixel correction device according to claim 9, wherein said modulation circuit comprises a multiplier for multiplying said differential value by said coefficient to obtain a multiplied value.

11. The defective pixel correction device according to claim 10, wherein said modulation circuit divides said multiplied value by 128.

12. The defective pixel correction device according to claim 9, wherein said predetermined function has different functions of brightness versus pixel value for different brightness ranges.

13. The defective pixel correction device according to claim 9, wherein said coefficient increases as said pixel value decreases.

* * * * *